(12) United States Patent
Gernand et al.

(10) Patent No.: US 6,942,827 B2
(45) Date of Patent: Sep. 13, 2005

(54) METHOD OF INJECTION MOLDING A GASKET

(75) Inventors: Erich Jacob Gernand, Northville, MI (US); Thomas J. Buster, Summerton, SC (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 18 days.

(21) Appl. No.: 10/775,430

(22) Filed: Feb. 10, 2004

(65) Prior Publication Data

US 2004/0155376 A1 Aug. 12, 2004

Related U.S. Application Data

(62) Division of application No. 10/289,891, filed on Nov. 7, 2002, now Pat. No. 6,722,660.
(60) Provisional application No. 60/392,523, filed on Jun. 27, 2002.

(51) Int. Cl.[7] .............................................. B29C 45/00
(52) U.S. Cl. .................... 264/138; 264/328.1; 264/161
(58) Field of Search ................................ 264/138, 161, 264/328.1

(56) References Cited

U.S. PATENT DOCUMENTS

| | | | |
|---|---|---|---|
| 2,764,311 A | * | 9/1956 | Blackman .................... 277/641 |
| 3,619,458 A | | 11/1971 | Engelhardt |
| 3,625,527 A | * | 12/1971 | Brindle ........................ 277/591 |
| 4,819,953 A | | 4/1989 | Joh |
| 5,031,924 A | | 7/1991 | Beatenbough et al. |
| 5,076,557 A | * | 12/1991 | Beatenbough et al. ...... 277/312 |
| 5,217,663 A | | 6/1993 | Seville |
| 5,228,702 A | * | 7/1993 | Browne et al. ............. 277/608 |
| 5,263,444 A | | 11/1993 | Prior et al. |
| 5,536,018 A | * | 7/1996 | Szott .......................... 277/313 |
| 5,687,975 A | * | 11/1997 | Inciong ....................... 277/591 |
| 6,065,757 A | | 5/2000 | Schneider et al. |

* cited by examiner

*Primary Examiner*—Edmund H. Lee
(74) *Attorney, Agent, or Firm*—Howard & Howard

(57) ABSTRACT

An injection molded gasket has a longitudinally extending gasket body with laterally opposite sides and a plurality of longitudinally spaced retention nubs projecting laterally outwardly of the body from the opposite sides. At least one longitudinally extending ingate rib is formed on the gasket body and bridges at least two adjacent retention nubs. The ingate rib has a trimmed edge that extends outwardly of the body no further than that of the retention nubs located adjacent the ingate rib.

6 Claims, 2 Drawing Sheets

METHOD OF INJECTION MOLDING A GASKET

The application is a division of application U.S. Ser. No. 10/289,891, filed on Nov. 7, 2002 now U.S. Pat. No. 6,722,660 which claims priority to the U.S. provisional application Ser. No. 60/392,523 which was filed on Jun. 27, 2002.

BACKGROUND OF THE INVENTION

1. Technical Field

This invention relates generally to molded gaskets, and more particularly to those designed to be received into a channel and molded with side retaining features that frictionally engage and hold the gasket within the channel.

2. Related Art

Injection molded gaskets fabricated of rubber and the like (such as NBR) are known for installation within a channel of a cover component or the like (e.g., a front cover of an engine). The top and bottom margins of the gasket present longitudinally extending seal surfaces that seal against the bottom wall of the channel and a facing surface of a mating component, respectively, to which the cover is to be mounted.

During manufacturing and servicing of the engine, it is desirable to firmly support the gasket within the channel while the cover is separated from the mating component to prevent unintended loss or misalignment of the gasket. In one known gasket construction, the gasket has molded retaining features in the form of a plurality of longitudinally spaced nubs or bump-like buttons that project laterally outwardly of the gasket on its opposite sides. The nubs extend a predetermined distance laterally outwardly from the body of the gasket, such that the tips of the nubs lay along a tip line on opposite sides of the gasket. The lateral spacing between the opposing tip lines is slightly greater than the width of the channel so that the nubs elastically deform and compress against the walls of the channel upon pressing the gasket into the channel.

One problem that the present inventors have discovered when working with such injection molded gaskets concerns the placement of the ingates of the mold tooling relative to the gasket. At least one, and typically several ingates are provided in the tooling for injecting the hot flowing gasket material into the die cavity. When the material cools, the material that remains in the ingates must be trimmed free of the gasket. What the inventors have found through development work is that while it is preferable to locate the ingates along the tip line of the nubs (which also lies in the central parting plane of the mold tooling), it is difficult at best to trim the ingate material following molding in a way that does not extend the gasket material beyond the tip line. This is particularly a problem when the ingates are required to be large enough to extend longitudinally across, and thus bridge, two or more adjacent retention nubs. With a tough material like NBR, for example, trimming the ingate material by conventional means still leaves a thick, wide, and relatively less flexible "rib" projection that decreases the flexibility of the affected nubs and causes the gasket to roll and misalign in the area of the ribs when the gasket is pressed into the channel.

It is an object of the present invention to overcome or minimize the foregoing limitations associated with molded gaskets.

SUMMARY OF THE INVENTION

An injection molded gasket constructed according to a presently preferred embodiment of the invention has a longitudinally extending gasket body with laterally opposite sides and a plurality of longitudinally spaced retention nubs projecting laterally outwardly of the body from the opposite sides. At least one longitudinally extending ingate rib is formed on the gasket body and bridges at least two adjacent ones of the retention nubs. The ingate rib has a trimmed edge that extends no further outwardly of the body than do the retention nubs located adjacent those nubs bridged by the ingate rib.

The invention further contemplates a method of injection molding gaskets in which at least one material ingate rib is formed on the gasket bridging at least two longitudinally adjacent retention nubs. The bridged nubs are formed and the ingate rib trimmed in such manner that a trimmed edge of the rib extends no further outwardly of the gasket body than do retention ribs located adjacent the bridged nubs.

The invention has the advantage of incorporating the ingate material into the gasket in such manner that it serves and can function as a retaining feature with the other retaining nubs.

THE DRAWINGS

These and other features and advantages of the present invention will become more readily appreciated when considered in connection with the following detailed description and appended drawings, wherein.

DETAILED DESCRIPTION

Figure 1:
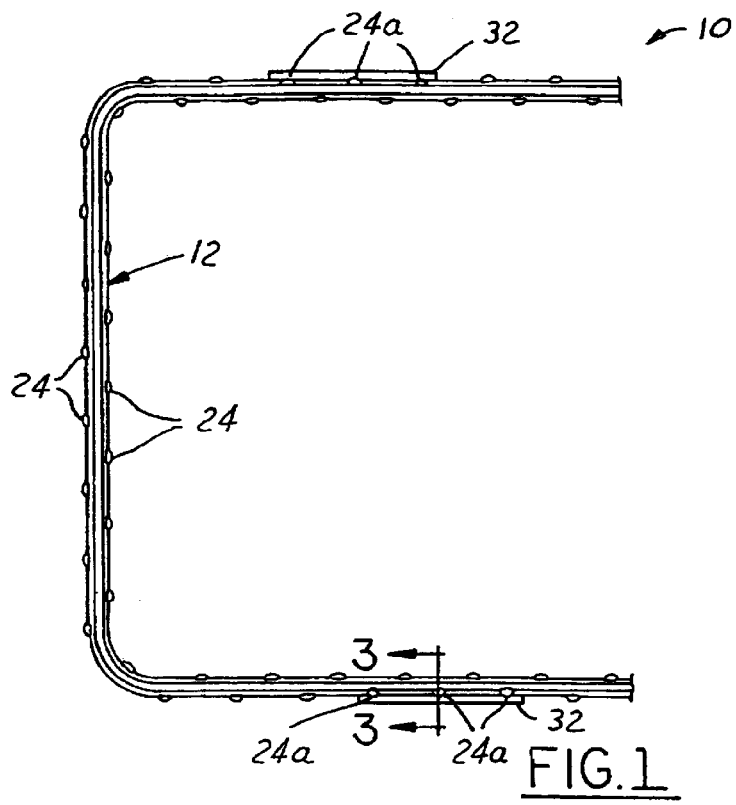
FIG. 1 is a plan view of a gasket constructed according to a presently preferred embodiment of the invention.

An injection molded gasket constructed according to a presently preferred embodiment of the invention is shown generally at 10 in FIG. 1. It will be understood that the particular shape of the gasket will conform to the particular requirements of a given application and thus will likely vary from one application to another depending upon the requirements. Accordingly, a somewhat generic rectangular gasket shape is illustrated in FIG. 1, with it being understood that the invention is not limited to this particular shape, but rather contemplates whatever shape and bends are necessary to meet the requirements of any given application.

The gasket 10 has a gasket body 12 that extends longitudinally in a circumferential direction along the length of the gasket. As shown best in FIGS. 3 and 4, the gasket body 12 has an upper sealing surface 14, a lower sealing surface 16, and laterally opposite side surfaces 18 which extend, together with the upper and lower surfaces 14, 16, in the longitudinal direction of the gasket 10 along its length.

The gasket 10 is injection molded from an organic polymeric material, such as NBR or other suitable material. The gasket body 12 is designed to be installed within a channel 20 of a cover 22 or the like, as illustrated best in FIG. 4.

Referring again to FIGS. 2 and 3, the gasket body 12 is molded with gasket retaining features 24. The retaining features 24 function to grip opposing side walls 26 of the channel 20 and are fabricated of the same injection molded material as that used to fabricate the body 12. The retaining features 24 are preferably in the form of a plurality of buttons or nubs which project laterally outwardly from the opposite lateral side surfaces 18 of the gasket body 12. The retaining nubs 24 are spaced longitudinally from one another and may be provided along the entire length of the gasket at a uniform spacing, if desired. The nubs 24 on one side surface 18 are preferably staggered longitudinally from the nubs 24 on the other side surface 18. The retaining nubs 24 extend to outer tip lines 28, 30 spaced from the gasket body 12 on the laterally opposite sides of the gasket body 12. The tip lines 28, 30 represent the outermost extent of the retaining nubs 24 when in their undeformed, pre-installed state. A lateral distance d between the opposing tip lines 28, 30 is preferably slightly greater than a distance D between the opposing side walls 26 of the channel 20, such that the width of the gasket 10, including the retaining features 24, is slightly wider than the width of the channel 20 prior to installation.

Figure 4:
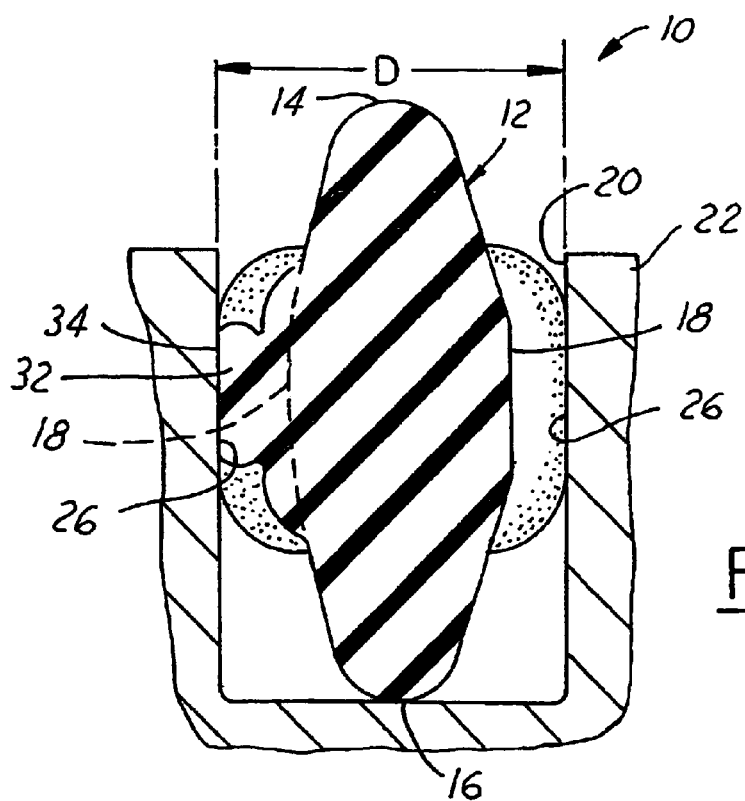
FIG. 4 is a view like FIG. 3, but showing the gasket installed in a channel.

The gasket 10 is installed into the channel 20 by pressing the gasket downwardly into the channel 20. As the gasket 10 enters the channel 20, the retaining nubs 24 engage and are elastically compressed and deformed by the side walls 26 of the channel 20, as illustrated in FIG. 4, for imparting a frictional retention force of the gasket within the channel 20 to prevent its inadvertent removal from the channel 20. The retention nubs 24 further support the gasket 10 against undesirable shifting or movement within the channel 20, once installed.

Figure 2:
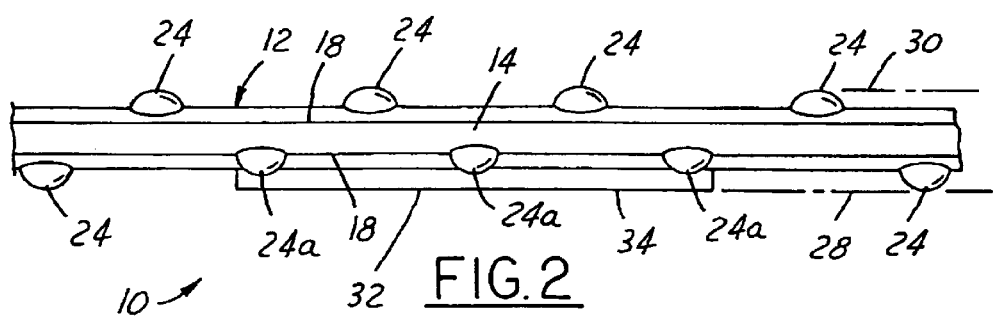
FIG. 2 is an enlarged fragmentary plan view of a portion of the gasket of FIG. 1.
Figure 3:
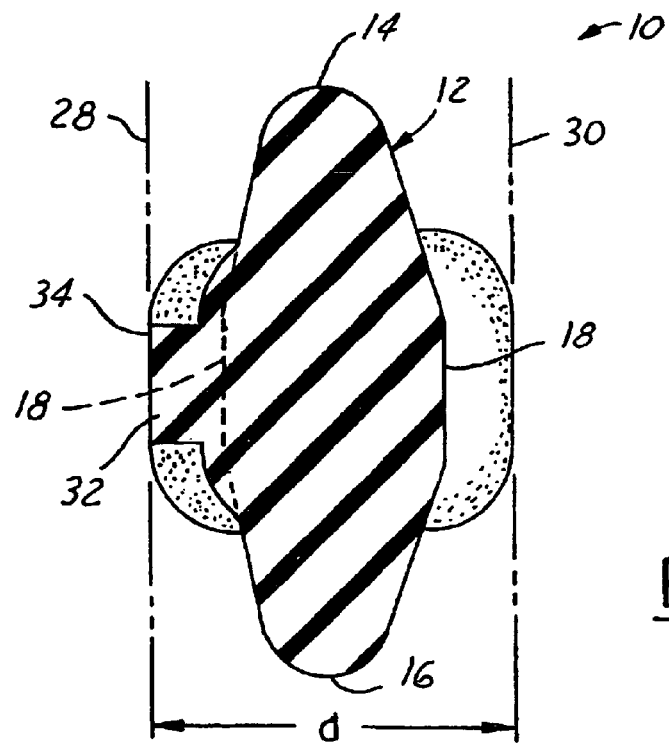
FIG. 3 is an enlarged cross-sectional view taken generally along lines 3—3 of FIG. 1 showing the gasket in a preinstalled condition.

Turning now particularly to FIGS. 2, 3 and 4, it will be seen that the gasket 10 is provided with at least one ingate material feature or rib 32 at spaced locations along the length of the gasket 10. Depending upon the size and configuration of the particular gasket 10, there may be the need to provide a plurality of such ingate material features 32 at spaced locations along the length of the gasket 10. These features 32 represent the material present in the ingate of split injection molds used to form the injection molded gasket 10, and through which hot, flowable gasket material is introduced into the die cavity in order to fill the cavity and form the various features of the gasket 10. Upon cooling, a certain amount of material remains in the ingate and, when the dies are opened to remove the gasket 10, the resultant ingate material features 32 remain as an integral molded portion of the gasket 10 which must be trimmed free of the gasket 10.

As shown best in FIG. 2, the ingate material feature 32 extends longitudinally across, and thus bridges two or more adjacent ones of the retaining nubs thereby defining bridged retaining nubs 24a. The illustrated embodiment shows three such retaining nubs being bridged. These bridged retaining nubs are designated 24a to distinguish them from the other non-bridged retaining nubs 24. Upon close inspection of FIGS. 2 and 3, it will be seen that the bridged retaining nubs 24a project laterally outwardly of the gasket body 12 by a lesser amount that of the non-bridged retaining features 24. The ingate material feature 32 is preferably in the form of a longitudinally extending rib of the gasket material. The ingate material feature 32 has a laterally outer trimmed edge 34 which extends beyond the bridged retaining nubs 24a, but no further than the tip line 28 of the non-bridged retaining nubs 24. Preferably, the trimmed edge 34 projects outwardly from the body 12 a distance equal to that of the non-bridged retaining nubs 24, and thus lies in the same tip line 28 as that of the non-bridged retaining features 24 adjacent the bridged retaining features 24a. As illustrated in FIG. 4, the projecting rib or lip of the ingate material 32 functions as a retaining feature together with the other non-bridged retaining nubs 24 and, when pressed into the channel 20, engages and grips the side walls 26 of the channel 20 without imparting any unbalanced twisting or rolling of the gasket away from the ingate material feature 32. The bridged retaining nubs 24a communicate with the ingate rib 32 to assist at least in part in inhibiting twisting or rolling of the gasket by providing torsional rigidity to the ingate rib 32 and gasket in assembly.

The ingate material feature 32 can be provided on one or both lateral sides 18 of the gasket body 12 and preferably are longitudinally spaced from one another.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of injection molding a gasket, comprising:
   injecting hot, flowable organic polymeric gasket material into a cavity of a mold through an ingate to form a longitudinally extending body of the gasket having laterally opposite side surfaces and a plurality of retaining nubs spaced longitudinally from one other and projecting laterally outwardly from the opposite side surfaces of the body;
   forming at least one longitudinally extending ingate rib of gasket material projecting laterally outwardly from at least one of the opposite side surfaces on the body and bridging at least two adjacent retaining nubs defining bridged retaining nubs and non-bridged retaining nubs, and
   allowing the gasket material to cool, opening and removing the gasket from the mold, and trimming the ingate rib to form a free trimmed edge of the ingate rib that projects from the body no further than the non-bridged retaining nubs.

2. The method of claim 1 wherein the trimming of the at least one ingate rib is performed so that the free trimmed edge and the non-bridged retaining nubs project from the body a substantially equal distance.

3. The method of claim 1 wherein the trimming of the at least one ingate rib is performed so that the free trimmed edge projects laterally outwardly from the body beyond the bridged retaining nubs.

4. The method of claim 1 wherein the forming of the retaining nubs is performed so that the retaining nubs on one of the opposite side surfaces are staggered longitudinally from the retaining nubs on the other of the opposite side surfaces.

5. The method of claim 1 wherein the forming of the retaining nubs is performed so that the bridged retaining nubs project laterally outwardly from the body by a lesser amount than the non-bridged retaining nubs.

6. The method of claim 1 wherein the forming of the bridged retaining nubs is performed so that the bridged retaining nubs communicate with the at least one longitudinally extending ingate rib and provide torsional rigidity to the at least one ingate rib, when installing the injection molded gasket within a channel.

* * * * *